US005649306A

United States Patent [19]

Vannatta et al.

[11] Patent Number: 5,649,306

[45] Date of Patent: Jul. 15, 1997

[54] PORTABLE RADIO HOUSING INCORPORATING DIVERSITY ANTENNA STRUCTURE

[75] Inventors: Louis Jay Vannatta, Crystal Lake; Kirk W. Dailey, Chicago; Randall S. Vaas, Lake Zurich, all of Ill.

[73] Assignee: Motorola, Inc., Schaumburg, Ill.

[21] Appl. No.: 308,054

[22] Filed: Sep. 16, 1994

[51] Int. Cl.$^{6}$ .................................................. H04B 7/04

[52] U.S. Cl. .......................... 455/575; 455/90; 455/133; 455/277.1; 343/702; 343/725

[58] Field of Search .............................. 455/89, 90, 101, 455/133, 134, 135, 272, 277.1, 278.1, 269, 277.2; 343/702, 700 MS, 793, 725

[56] References Cited

U.S. PATENT DOCUMENTS

| | | | |
|---|---|---|---|
| 4,313,119 | 1/1982 | Garay et al. | 343/702 |
| 4,862,182 | 8/1989 | Egashira | 343/702 |
| 4,914,714 | 4/1990 | Tamura | 455/133 |
| 5,119,501 | 6/1992 | Perry et al. | 455/134 |
| 5,175,759 | 12/1992 | Metroka et al. | 455/89 X |
| 5,303,396 | 4/1994 | Ooyagi et al. | 455/134 |
| 5,337,061 | 8/1994 | Pye et al. | 455/89 |
| 5,369,801 | 11/1994 | Smith | 455/134 |
| 5,444,745 | 8/1995 | Ali-Vehmas | 455/133 |
| 5,463,406 | 10/1995 | Vannatta et al. | 343/725 |
| 5,508,709 | 4/1996 | Krenz et al. | 455/90 X |

FOREIGN PATENT DOCUMENTS

| | | |
|---|---|---|
| 0 343 847 | 11/1989 | European Pat. Off. . |
| 0 451 623 A1 | 10/1991 | European Pat. Off. . |
| 4396911T1 | 1/1995 | Germany . |
| 2219911 | 12/1989 | United Kingdom . |

*Primary Examiner*—Reinhard J. Eisenzopf
*Assistant Examiner*—Philip J. Sobutka
*Attorney, Agent, or Firm*—Kirk W. Dailey; Randall S. Vaas

[57] ABSTRACT

A radio communication device (50) has a housing having a first housing element (51) and a second housing element (53). The first housing element (51) is movable between an extended and a closed position. The radio communication device has at least two antennas (112, 113). A switch (121) is provided that is operable to switch between a first antenna (112) and a second antenna (113) responsive to position of the first housing element (51). Preferably the first antenna (112) is disposed in the first housing element (51) and the second antenna (113) is disposed in the second housing element (53) or a battery housing (57).

14 Claims, 3 Drawing Sheets

PORTABLE RADIO HOUSING INCORPORATING DIVERSITY ANTENNA STRUCTURE

FIELD OF THE INVENTION

The present invention relates generally to antennas and, more particularly, to an antenna structure including at least two antennas that are switched into and out of the antenna structure.

BACKGROUND OF THE INVENTION

A communication system is comprised, at a minimum, of a transmitter and a receiver interconnected by a communication channel. A communication signal is transmitted by the transmitter upon the transmission channel to be received by the receiver. A radio communication system is a communication system in which the transmission channel comprises a radio frequency channel defined by a range of frequencies of the electromagnetic frequency spectrum. A transmitter operative in a radio communication system must convert the communication signal into a form suitable for transmission upon the radio-frequency channel.

Conversion of the communication signal into a form suitable for transmission upon the radio-frequency channel is effectuated by a process referred to as modulation. In such a process, the communication signal is impressed upon an electromagnetic wave. The electromagnetic wave is commonly referred to as a "carrier signal." The resultant signal, once modulated by the communication signal, is commonly referred to as a modulated carrier signal. The transmitter includes circuitry operative to perform such a modulation process.

Because the modulated carrier signal may be transmitted through free space over large distances, radio communication systems are widely utilized to effectuate communication between a transmitter and a remotely-positioned receiver.

The receiver of the radio communication system which receives the modulated carrier signal contains circuitry analogous to, but operative in a manner reverse with that of, the circuitry of the transmitter and is operative to perform a process referred to as demodulation.

Numerous modulated carrier signals may be simultaneously transmitted upon differing radio frequency channels of the electromagnetic frequency spectrum. Regulatory bodies have divided portions of the electromagnetic frequency spectrum into frequency bands, and have regulated transmission of the modulated carrier signals upon various ones of the frequency bands. (Frequency bands are further divided into channels, and such channels form the radio-frequency channels of a radio communication system.)

A two-way radio communication system is a radio communication system, similar to the radio communication system above-described, but which permits both transmission and reception of a modulated carrier signal from a location and reception at such location of a modulated carrier signal. Each location of such a two-way radio communication system contains both a transmitter and a receiver. The transmitter and the receiver positioned at a single location typically comprise a unit referred to as a radio transceiver, or more simply, a transceiver.

A two-way, radio communication system which permits alternate transmission and reception of modulated carrier signals is referred to as a simplex system. A two-way radio communication system which permits simultaneous transmission and reception of communication signals is referred to as a duplex system.

A cellular communication system is one type of two-way radio communication system in which communication is permitted with a radio transceiver positioned at any location within a geographic area encompassed by the cellular communication system.

A cellular communication system is created by positioning a plurality of fixed-site radio transceivers, referred to as base stations or base sites, at spaced-apart locations throughout a geographic area. The base stations are connected to a conventional, wireline telephonic network. Associated with each base station of the plurality of base stations is a portion of the geographic area encompassed by the cellular communication system. Such portions are referred to as cells. Each of the plurality of cells is defined by one of the base stations of the plurality of base stations, and the plurality of cells together define the coverage area of the cellular communication system.

A radio transceiver, referred to in a cellular communication system as a cellular radiotelephone or, more simply, a cellular phone, positioned at any location within the coverage area of the cellular communication system, is able to communicate with a user of the conventional, wireline, telephonic network by way of a base station. Modulated carrier signals generated by the radiotelephone are transmitted to a base station, and modulated carrier signals generated by the base station are transmitted to the radiotelephone, thereby to effectuate two-way communication therebetween. (A signal received by a base station is then transmitted to a desired location of a conventional, wireline network by conventional telephony techniques. And, signals generated at a location of the wireline network are transmitted to a base station by conventional telephony techniques, thereafter to be transmitted to the radiotelephone by the base station.)

Increased usage of cellular communication systems has resulted, in some instances, in the full utilization of every available transmission channel of the frequency band allocated for cellular radiotelephone communication. As a result, various ideas have been proposed to utilize more efficiently the frequency band allocated for radiotelephone communications. By more efficiently utilizing the frequency band allocated for radiotelephone communication, the transmission capacity of an existing, cellular communication system may be increased.

The transmission capacity of the cellular communication system may be increased by minimizing the modulation spectrum of the modulated signal transmitted by a transmitter to permit thereby a greater number of modulated signals to be transmitted simultaneously. Additionally, by minimizing the amount of time required to transmit a modulated signal, a greater number of modulated signals may be sequentially transmitted.

By converting a communication signal into discrete form prior to transmission thereof, thereby to form a digital code, the resultant modulated signal is typically of a smaller modulation spectrum than a corresponding modulated signal comprised of a communication signal that has not been converted into discrete form. Additionally, when the communication signal is converted into discrete form prior to modulation thereof, the resultant, modulated signal may be transmitted in short bursts, and more than one modulated signal may be transmitted sequentially upon a single transmission channel.

A transmitter which converts the communication signal into discrete form converts the communication signal into a digital code which is modulated and then transmitted upon the communication channel.

While, ideally, the signal received by the receiver is identical with that of the signal transmitted by the transmitter, the signal actually received by the receiver is not a single signal but rather the summation of signals transmitted thereto by differing paths. While one or more shortest-distance paths interconnect the transmitter and the receiver, a multiplicity of other signal paths also interconnect the transmitter and the receiver. For instance, the signal transmitted by the transmitter may be reflected off of both man-made or natural objects prior to reception by the receiver and signals transmitted upon such paths are received by the receiver, delayed in time relative to signals transmitted upon the shortest-distance paths. Because of such multiplicity of transmission paths, an actual communication channel is oftentimes referred to as a multipath channel and the signal received by the receiver is, hence, a summation of the plurality of signals transmitted thereto along the multiplicity of transmission paths. Because signals transmitted along other than the shortest-distance transmission paths arrive at the receiver delayed in time relative to the signal transmitted along the shortest-distance transmission path late-arriving signals interfere with previously-arrived signals. When the signal transmitted by the transmitter comprises the modulated, digital code, such interference is referred to as intersymbol interference. When such intersymbol interference is significant, the signal actually transmitted by the transmitter cannot be recreated by the receiver.

Receivers have been constructed which have two or more spaced-apart antennas for receiving signals transmitted thereto. The signals received at one or the other of the two or more spaced-apart antennas is utilized by circuitry of the receiver to recreate the signal actually transmitted by the transmitter. The antennas are positioned in relative orientations (such as, in a two-antenna configuration, in a mutually-orthogonal orientation) such that when a signal received at one of the antennas includes significant interference or is weak, a signal received at another of the antennas includes, typically, a lesser amount of interference or is of a greater strength. When two or more antennas are configured in such manner, the antennas are referred to as being in diversity (or, diversity antennas), and a receiver including such antennas configured in diversity are referred to as diversity receivers. And, transceivers including such antennas are referred to as diversity transceivers.

Since most of the surface area of a portable radio is normally obstructed by a user's hand, a logical location for an integrated antenna is in an extended portion of the radiotelephone housing. This extended housing may be realized by rotating a flip outwards, by twisting a portion of the radiotelephone housing, or by sliding a portion of the radiotelephone housing from a first position to a second position. Such a portable radio has valid modes of operation when the housing element is in the first position as well as in the second position.

A difficulty in the antenna design arises when the antenna in the second position is in close proximity to the electrical components of the portable radio and the antenna in the first position is further away from the inner components of the radio. Typically, an antenna must be tuned to match the impedance of the transceiver for maximum performance of the antenna. The matching of an antenna is highly dependent upon the position of the antenna during its operation. Here, the antenna has two physical positions. If the antenna is tuned when in the first position, then when the antenna is in the second position, near the electrical components of the transceiver, the antenna is detuned. A detuned antenna has a poor impedance match to the power amplifier and suffers a substantial loss of performance. Thus, it is necessary to develop an antenna structure that functions efficiently when the movable housing element containing an integrated antenna is in the first position and in the second position.

BRIEF DESCRIPTION OF THE DRAWINGS

The present invention will be better understood when read in light of the accompanying drawings in which.

DESCRIPTION OF THE PREFERRED EMBODIMENTS

Figure 1:
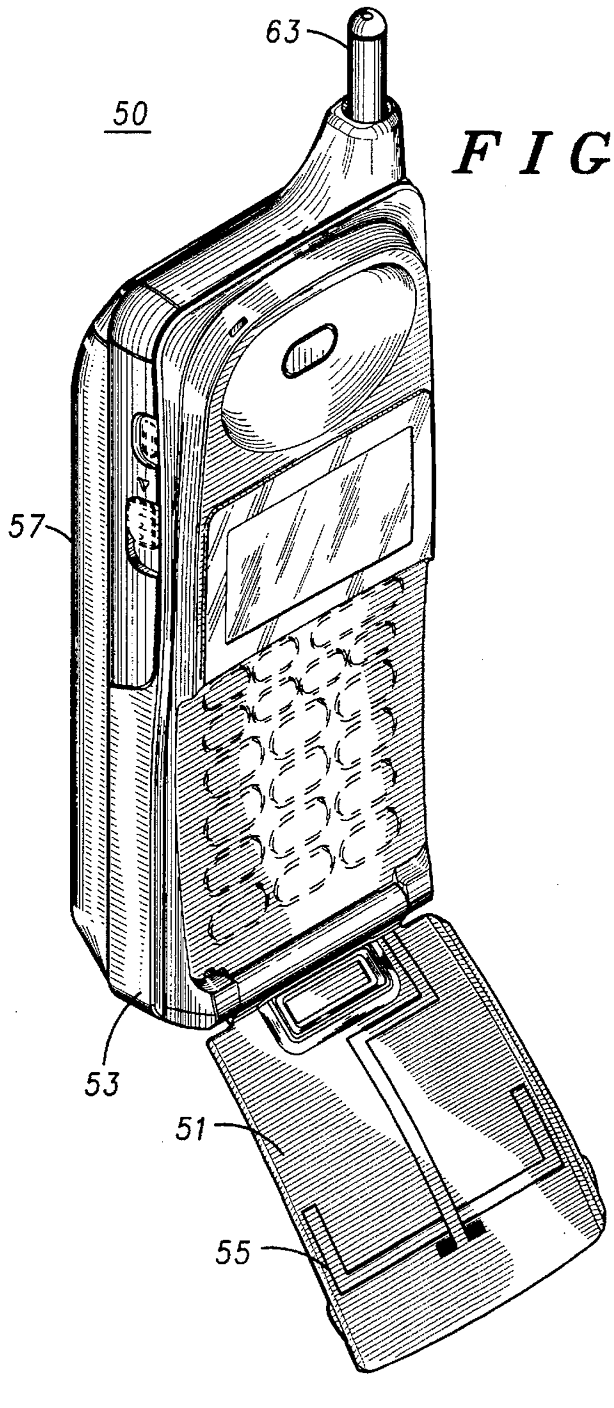
FIG. 1 is an illustration of a radiotelephone in an extended position in accordance with a preferred embodiment of the present invention.

Referring to a the illustration of FIG. 1, FIG. 2, FIG. 3 and FIG. 4, a radio communication device or more specifically a portable radio telephone, referred to generally by reference numeral 50, of a preferred embodiment of the present invention is shown. Here, the portable radiotelephone 50 has a housing made up of a first housing element 51 and a second housing element 53, and a battery housing 57.

Figure 2:
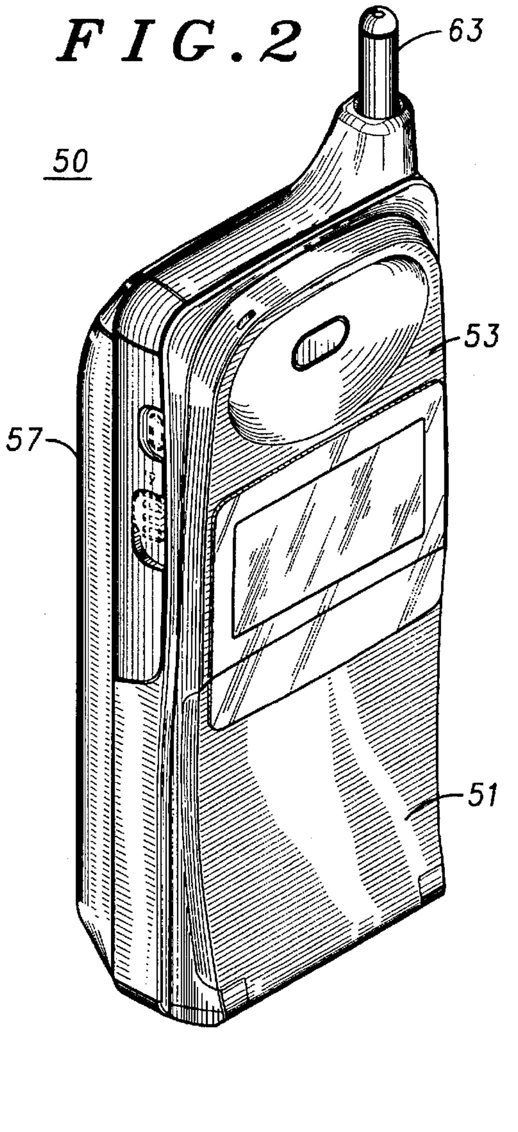
FIG. 2 is an illustration of a radiotelephone in a closed position in accordance with a preferred embodiment of the present invention.

The first housing element 51 is movable between a first position, or an extended position, as illustrated in FIG. 1 and a second position, or a closed position, as illustrated in FIG. 2. Additionally, a first antenna 55 is disposed in the first housing element 51. In the preferred embodiment, the first antenna 55 is a half-wave dipole type antenna, however, it is understood that any other equally sufficient antenna including a loop type, a patch type, or a monopole antenna could be substituted for the half-wave dipole antenna 55.

Figure 3:
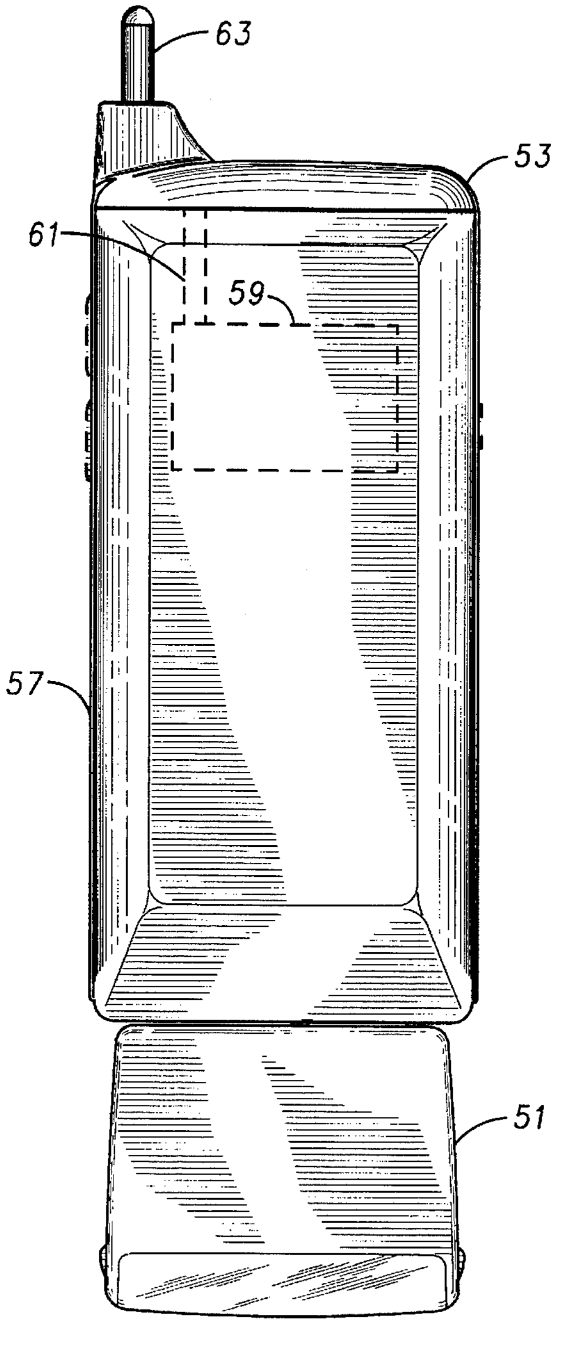
FIG. 3 is an illustration of a rear elevational view of a radiotelephone in an extended position in accordance with an alternative preferred embodiment of the present invention.
Figure 4:
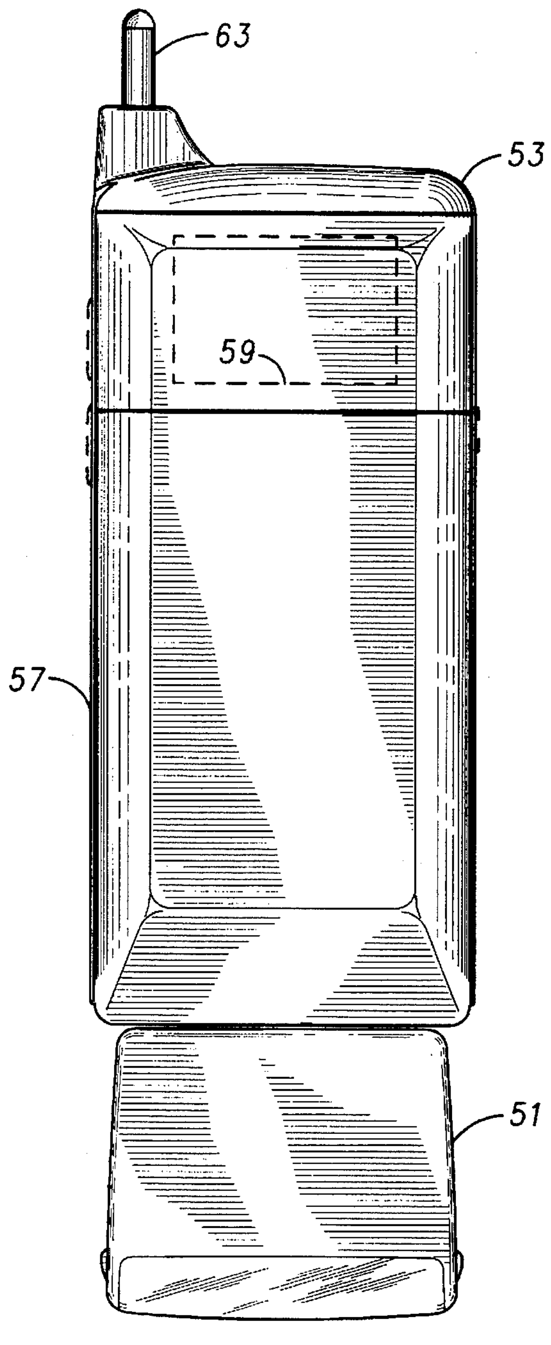
FIG. 4 is an illustration of a rear elevational view of a radiotelephone in an extended position in accordance with an alternative preferred embodiment of the present invention.

The second housing element 53 contains a substantial portion of the radiotelephone's circuitry. A second antenna and a third antenna may be disposed in the second housing element 53. The second antenna may be implemented in several different manners, of which the following are a possibility. First, the second antenna may be of the type described in U.S. patent application Ser. No. 07/995,113 filed on Dec. 22, 1992. Second, as illustrated in FIG. 3, the second antenna may be a patch antenna 59 integrated into the battery housing 57 and coupled to the radiotelephone's radio circuitry via a transmission line 61. Third, the second antenna may be a patch antenna 59 integrated into the second housing element 53, as illustrated in FIG. 4.

In the preferred embodiment, the third antenna is a retractable whip antenna 63 as illustrated in FIG. 1–FIG. 4. However, any other sufficient antenna may be substituted for such an antenna, including: a helix disposed in the second housing element or a non-retractable whip antenna.

Figure 5:
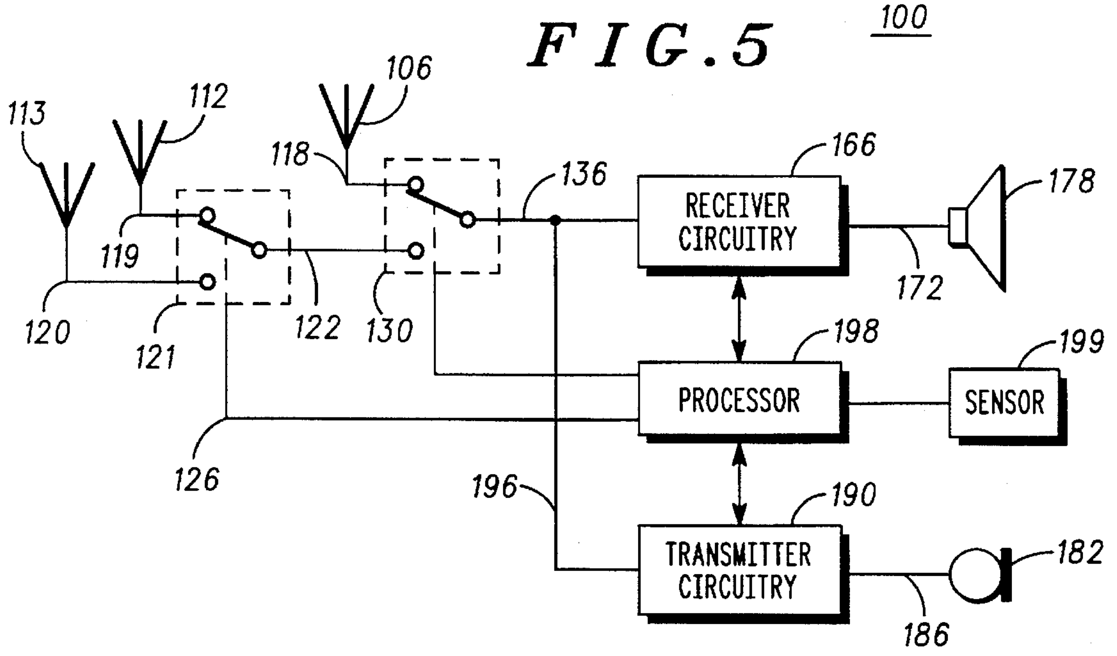
FIG. 5 is a block diagram of a transceiver of a first, preferred embodiment of the present invention.

Referring to the block diagram of FIG. 5, a transceiver, referred to generally by reference numeral 100, of a preferred embodiment of the present invention is shown. Transceiver 100 is operable both to receive and to transmit modulated signals. Transceiver 100 includes three antennas, here antennas 106, 112 and 113. Antenna 106 is configured in diversity with either antenna 112 or antenna 113.

When receiving a modulated signal transmitted to transceiver 100, antenna 106 is operative to receive such transmitted signal and to convert such transmitted signal into an electrical signal on line 118. Antenna 112 and antenna 113 are similarly operative to receive such transmitted signal and to convert such transmitted signals into electrical signals on lines 119 and 120.

Lines 119 and 120 are coupled to switch 121, here shown to be a single-throw, double-pole switch. Switch 121 may, of course, be embodied by an electronic device, such as a multiplexer circuit. Depending upon the switch position of switch 121, either line 119 or line 120 is coupled to line 122, thereby either to supply the signal generated on line 119 or the signal generated on line 120 to switch 130.

Lines 118 and 122 are coupled to switch 130, here shown to be a single-throw, double-pole switch. Switch 130 may, of course, be embodied by an electronic device, such as a multiplexer circuit. Depending upon the switch position of switch 130, either line 118 or line 122 is coupled to line 136, thereby either to supply the signal generated on line 118 or the signal generated on line 122 to receiver circuitry 166. Receiver circuitry 166 is operative, typically, to down-convert in frequency the signal applied thereto, to demodulate the down-converted signal, to decode such demodulated signal, and to supply the decoded signal by way of line 172 to a transducer, here speaker 178.

A transmit portion of transceiver 100 is further shown in the figure and includes a transducer, here microphone 182 which generates an electrical signal on line 186 which is supplied to transmitter circuitry 190. Transmitter circuitry 190 is operative in a manner analogous to, but reverse to that of, receiver circuitry 166 and is operative to generate a modulated signal on line 196 which is coupled to either antenna 106, antenna 112 or antenna 113 by way of switch 130 and switch 121 to permit transmission of a modulated signal therefrom.

Processor 198 further forms a portion of transceiver 100 and is operative to control operation of receiver and transmitter circuitry 166 and 190 as well as to control the switch position of switch 130 and switch 121.

Processor 198 contains appropriate control algorithms embodied therein to determine from which antenna, antenna 106, antenna 112 or antenna 113 that a received signal is to be applied to receiver circuitry 166. In the preferred embodiment of the present invention, the antenna 112, which is analogous to the first antenna 55 of FIG. 1, is disposed in the first housing element 51 that is movable between the extended and closed positions. A sensor 199 is used to determine the current position of the first housing element and inform the processor 198 of that position. In response to the current position, the processor 198 generates a control signal on line 126 to control the state of the switch 121. Preferably, the switch 121 couples the antenna 112 to line 122 when the first housing element 51 is in the extended position. Likewise, the switch couples the antenna 113, which is analogous to the second antenna discussed earlier, when the first housing element 51 is in the closed position. Thus, providing a selected antenna for the switch 130.

As discussed in the background, when the first housing element 51 is in the closed position, the first antenna 112 is affected by a large conductive body created by the radio circuitry disposed in the second housing element 53, causing the first antenna 112 to become detuned. In order to provide an antenna structure that functions efficiently when the first housing element 51 containing an integrated antenna is in the first position and in the second position, the second antenna 113 provides a properly tuned antenna when the first housing element 51 is in the closed position.

In the preferred embodiment of the present invention, such control algorithm is operative to cause positioning of switch 130 to permit sampling by receiver circuitry 166 of signals received by the antenna 106 and the antenna selected from antenna 112 and antenna 113. Responsive to such sampling, a determination is made as to which of the antennas is to be coupled to receiver circuitry 166. The line 118 and the line 122 are commonly referred to as diversity branch 1 and diversity branch 2.

Figure 6:
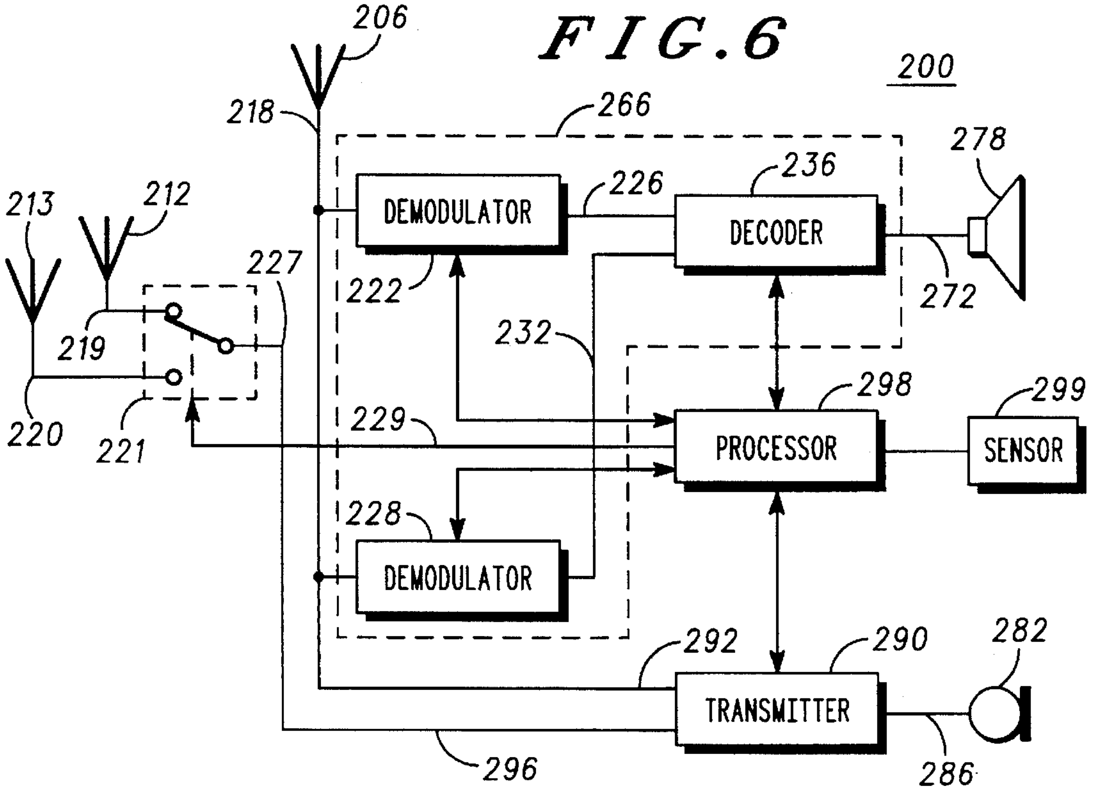
FIG. 6 is a block diagram of a transceiver of an alternate, preferred embodiment of the present invention.

FIG. 6 is a block diagram, also of a diversity transceiver, here referred to generally by reference numeral 200. Diversity transceiver 200 includes circuitry permitting both transmission and reception of modulated signals. Diversity transceiver 200 also includes three antennas, antenna 206, 212, and 213.

When receiving a modulated signal transmitted to diversity transceiver 200, antenna 206 is operative to receive such transmitted signal and to convert such transmitted signal into an electrical signal on line 218. Line 218 is coupled to demodulator circuit 222. Demodulator circuit 222 is operative to demodulate the signal applied thereto and to generate a demodulated signal indicative thereof on line 226.

Similarly, when transceiver 200 is operative to receive a modulated signal, antenna 212 and 213 are operative to receive such transmitted signals and to convert such transmitted signals into an electrical signal on line 219 and 220, respectively. Lines 219 and 220 are coupled to switch 221, here shown to be a single-throw, double-pole switch. Switch 221 may, of course, be embodied by an electronic device, such as a multiplexer circuit. Depending upon the switch position of switch 221, either line 219 or line 220 is coupled to line 227. Line 227 is coupled to demodulator circuit 228 which is operative to demodulate and to generate a demodulated signal on line 232.

Lines 226 and 232 are coupled to inputs of decoder 236 which is operative to decode a signal applied thereto. Demodulators 222 and 228 and decoder 236 together comprise receiver circuitry analogous to receiver circuitry 166 of transceiver 100 of FIG. 5. Such receiver circuitry is indicated in the figure by reference numeral 266 which includes the elements contained within the block, shown in hatch.

A decoded signal generated by decoder 236 is generated on line 272 which is applied to a transducer, here speaker 278.

The transmitter portion of diversity transceiver 200 includes a transducer, here microphone 282 which generates an electrical signal on line 286 which is applied to transmitter circuitry 290. Transmitter circuitry 290 is operative in a manner analogous to, but reverse to that of, operation of receiver circuitry 266, and is operative to generate modulated signals alternately on lines 292 and 296 which are coupled to antennas 206 and either 212, or 213 depending upon the position of the switch 221.

Processor circuitry 298 further forms a portion of diversity transceiver 200. Processor circuitry includes appropriate control algorithms to control operation of component portions of receiver circuitry 266 and transmitter circuitry 290. Such control algorithms embodied therein include algorithms for controlling operation of demodulators 222 and 228. Demodulators 222 and 228 are alternately operative to generate demodulated signals such that demodulated signals generated by only one of the demodulators is supplied to decoder 236 by way of line 226. Operation of one or the other of the demodulators 222 and 228 is determinative of whether signals received at antenna 206 or antenna 212 are applied to decoder 236.

The process of selection from which antenna a received signal is utilized to generate the decoded signal on line 272 is analogous to the process of selection by which the processor circuitry 198 of transceiver 100 makes selection of antennas, and such process shall not again be described. As processor 298 causes operation either of demodulator 222 or demodulator 228, control signals generated by processor circuitry 298 control selection of antenna 206 212, or 213 in manners analogous to the control signals generated by processor 198 to control the switch position of switch 130 of transceiver 100. The demodulators 222 and 228 are also commonly referred to as diversity branches.

In the preferred embodiment of the present invention, the antenna 212, which is analogous to the first antenna 55 of FIG. 1, is disposed in the first housing element 51 that is movable between the extended position and the closed position. A sensor 299 is used to determine the current position of the first housing element and inform the processor 298 of that position. In response to the current position, the processor 298 generates a control signal on line 229 to control the state of the switch 221. Preferably, the switch 221 couples the antenna 212 to line 227 when the first housing element 51 is in the extended position. Likewise, the switch 221 couples the antenna 213, which is analogous to the second antenna discussed earlier, when the first housing element 51 is in the closed position. Thus, coupling a selected antenna to the demodulator 228 or to the transmitter 290.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

We claim:

1. A diversity antenna structure for a radio having radio circuitry operative in a radio communication system, the radio having a first movable housing element and a second housing element, the first movable housing element movable between an extended position and a closed position and a substantial portion of the radio circuitry disposed within the second housing element, said antenna structure comprising:

a first antenna disposed in the first movable housing element and operative when the first movable housing element is in the extended position;

a second antenna disposed in the second housing element and operative when the first movable housing element is in the closed position;

a third antenna disposed in the second housing element, and operative when the first movable housing element is in the extended position and when the first movable housing element is in the closed position; and a first switch device operatively coupled to the first housing element, said first antenna, said second antenna, and the radio circuitry, said switch device selectively coupling one of said first antenna and said second antenna to the radio circuitry, wherein said switch device is responsive to the position of said first movable housing element for switching in said first antenna when the first housing element is in the extended position and for switching in said second antenna when the first housing element is the closed position.

2. The diversity antenna structure as defined in claim 1, further including a controller and a second switch device coupled to said third antenna and to said first switch device, said processor controlling said second switch device to selectively connect said third antenna to the radio circuitry.

3. The diversity antenna structure as defined in claim 1, further including a controller, and wherein the radio circuitry includes a first demodulator coupled to the first switch and a second demodulator coupled to the third antenna, wherein said controller selects one of the first demodulator and the second demodulator.

4. The diversity antenna structure as defined in claim 1, wherein the first switch device includes a sensor to sense the position of the first housing element, a controller coupled to the sensor, and a switch coupled to the controller.

5. A radio including a diversity antenna structure and having radio circuitry operative in a radio communication system, the radio having a first movable housing element and a second housing element wherein said first movable housing element is movable between an extended position and a closed position and a substantial portion of the radio circuitry is disposed within said second housing element, the radio circuitry operating with selected antennas of the antenna structure in a diversity mode, said antenna structure comprising:

a first antenna disposed in said first movable housing element and operative when said first movable housing element is in said extended position;

a second antenna disposed in said second housing element and operative when said first movable housing element is in said closed position;

a third antenna extending from said second housing element, the third antenna selectively operative with an antenna chosen from the group of the first antenna and the second antenna; and a first switch selecting the first and third antennas when said first housing element is in the extended position and selecting the second and third antennas when the second housing element is in the closed position.

6. The radio of claim 5 wherein said first antenna is a half-wave dipole antenna and said second antenna is a patch antenna.

7. The radio of claim 5 wherein said first movable housing element is a flap and is pivoted from the closed position to the extended position.

8. The radio as defined in claim 5, further including a controller, and wherein the radio circuitry includes a first demodulator coupled to the first switch and a second demodulator coupled to the third antenna, wherein said controller select one of the first demodulator and the second demodulator.

9. The diversity antenna structure as defined in claim 8, wherein the first switch device selectively connects one of said first and second antennas to a first conductor, and said second switch device selectively connects one of said first conductor and said third antenna to the radio circuitry.

10. The radio as defined in claim 5, further including a controller and a second switch coupled to said third antenna and to said first switch, said controller controlling said second switch to selectively connect said third antenna to the radio circuitry.

11. The radio as defined in claim 10, wherein the first switch selectively connects one of said first and second antennas to a first conductor, and the second switch selectively connects one of said first conductor and said third antenna to the radio circuitry.

12. The radio as defined in claim 10, wherein the radio circuitry includes a receiver coupled to said second switch and to said controller.

13. A radio communication device having a first housing element and a second housing element and radio circuitry, the first housing element is movable between a first position and a second position, and a substantial portion of the radio circuitry disposed in the second housing element, the radio communication device comprising:

a transceiver having a first diversity branch and a second diversity branch;

a first antenna disposed within the first housing element;

a second antenna having at least a first portion disposed within the second housing element;

a third antenna extending from the second housing element and coupled to said first diversity branch; and a switching device to sense the position of the first housing element and to couple one of the first antenna and the second antenna to the second diversity branch according to the sensed position of the first housing element.

14. The radio communication device of claim 13 wherein said first movable housing element is a flap and is rotated between the first position and the second position.

* * * * *